United States Patent [19]

Long et al.

[11] Patent Number: 4,736,669

[45] Date of Patent: Apr. 12, 1988

[54] AIRCRAFT MISSILE LAUNCHER MOUNTING APPARATUS

[75] Inventors: Kenneth R. Long, Plano; Gary D. Poole, Garland; David A. Witt, Rowlett; Ronald L. Dale, Royse City, all of Tex.

[73] Assignee: Varo, Inc., Garland, Tex.

[21] Appl. No.: 17,777

[22] Filed: Feb. 20, 1987

[51] Int. Cl.[4] .............................................. F41F 7/00
[52] U.S. Cl. ..................................... 89/1.819; 89/1.53
[58] Field of Search ................... 89/1.819, 1.53, 1.58, 89/1.8, 1.806

[56] References Cited

U.S. PATENT DOCUMENTS 4,155,286  5/1979  Mihm .................................. 89/1.819
4,412,475  11/1983  Hornby ........................... 89/1.53 X
4,660,456  4/1987  Griffin et al. ....................... 89/1.819

Primary Examiner—David H. Brown
Attorney, Agent, or Firm—Jerry W. Mills; Roger N. Chauza

[57] ABSTRACT

A missile launcher is disclosed having an elongate planar platform (28) formed integral with the body of the launcher (26). Plural bomb rack fasteners (34, 36) and pylon mounting lugs (38, 40) are fixed to the platform surface (28) to accommodate different aircraft types. Plural sway braces (46) are removably fixed to the side edges of the platform surface (28). Each sway brace (46) can be fixed to desired positions along the side edges of the platform surface (28) to also accommodate different aircraft type mounting apparatus.

11 Claims, 1 Drawing Sheet

AIRCRAFT MISSILE LAUNCHER MOUNTING APPARATUS

TECHNICAL FIELD OF THE INVENTION

The present invention relates in general to missile launchers, and more particularly relates to apparatus for adapting missile launchers to fit different types of aircraft.

BACKGROUND OF THE INVENTION

Missiles are generally not mounted directly to an aircraft, but rather are mounted to launchers which are fixed to the aircraft. In this manner, the missile can be launched from the launcher, while the launcher remains fixed to the aircraft. Conventional missile launchers include a rail structure for holding a missile, and electromechanical apparatus for fixing the missile to the launcher during aircraft take-offs and landings. A release mechanism arms the missile and releases it for launching. Power supply equipment is also housed within the launcher for controlling the fusing and firing of the missile, and in the heat seeking type of missiles, equipment for interconnecting a source of compressed nitrogen to the missile for an infrared detector.

Missiles are generally adapted for launching from different types of aircraft, and thus the associated launcher must be adapted to fit many types of aircraft. Aircraft bomb racks and pylons are typical of structures for attachment of missile apparatus to the aircraft. Military aircraft bomb racks have hooks with mounting centers typically of fourteen inches or thirty inches. Aircraft pylon mounting structures comprise studs or threaded holes which are spaced apart about thirty inches. In the case of Sidewinder missiles, adapters have been provided for mounting a missile launcher to the bomb racks.

In order to accommodate both types of mounting centers, the adapter includes sway braces for preventing angular or rotational movement of the launcher and attached missile when fixed to the aircraft. The sway braces comprise large flat areas extending laterally on each side of the adapter which abut with adjusting bolts in aircraft outrigger apparatus. When properly adjusted, any launcher wobble about the mounting centers is eliminated. Such an adapter is identified as ADU-299A/A. While this launcher adapter is operable to fix missile launchers to various types of aircraft, it is expensive, adds weight to the load of the aircraft, and extends the missile further away from the aircraft. The adapter itself, as well as the spacing of the missile further from the wing, affects the aerodynamic efficiency of the aircraft.

While not commercialized, sway braces have been previously developed for attachment to desired positions along the body of a missile launcher. According to one type of sway brace developed by Frazer-Nash, Ltd., Randalls Way, Leatherhead, Surrey, United Kingdom, a longitudinal T-slot was formed along the top surface of the launcher. A small sway brace with a T-protrusion could be placed in the slot and adjusted to desired positions along the body of the launcher to accommodate different types of bomb racks. In another version, a plurality of individual T-slots were cut down into the body of the launcher. Sway braces with T-protrusions could then be dropped into the desired T-slots.

From the foregoing, it can be seen that a need exists for improved missile launcher apparatus which is less costly, more compact, adaptable to various bomb rack spacings, and which prevents any sway or wobble of the launcher and attached missile.

SUMMARY OF THE INVENTION

In accordance with the present invention, the disclosed missile launcher apparatus reduces or substantially eliminates the disadvantages and shortcomings of the associated prior art launchers and associated adapters. In accordance with the invention, the missile launcher itself is constructed for mounting directly to different types of bomb racks or pylons without an intervening adapter. A number of small lateral sway braces can be located at desired positions along the launcher to accommodate a variety of bomb rack outrigger equipment.

In the preferred embodiment of the invention, the body of the missile launcher is formed with an elongate top planar surface to provide sufficient rigidity of the launcher for the cantilever suspension thereof when mounted at the fourteen inch centers to the aircraft. Plural spaced apart threaded holes in the planar surface are adapted for receiving corresponding threaded suspension lugs which are fixed to the bomb racks. Other holes allow the launcher to be fixed to aircraft Pylon mountings.

In one embodiment of the invention, a number of small threaded holes are formed laterally into opposing side edges of the platform. Sway braces can be fixed by bolts at desired positions along the platform to provide a wedge between the launcher body and bomb rack apparatus, thereby preventing wobble or angular movement of the launcher as it hangs suspended from the bomb rack.

The sway braces according to the first embodiment are generally wedge-shaped, including a curved foot surface for engaging the tubular body of the launcher, and further including an upper generally flat surface against which bomb rack outrigger equipment abuts. A pair of spaced apart sway braces mounted to each side of the launcher platform is adequate to prevent any sway tendency of the launcher and attached missile.

In another embodiment of the invention, the opposing side edges of the planar platform include plural dovetail mortises, and each sway brace is constructed with corresponding dovetail tenons. In the second embodiment, the sway brace also includes a curved foot surface for also engaging the curved missile launcher body, and means for bolting the sway brace through such foot to the launcher body. The missile launcher body can be recessed somewhat to receive the curved foot of the sway brace, and therby provide additional load bearing capacity to the brace.

In both embodiments of the invention, the sway braces can be moved to any longitudinal position along the launcher body, and fixed thereto to accommodate the positional constraints of different aircraft outrigger equipment.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts throughout the views, and in which.

DETAILED DESCRIPTION OF THE INVENTION

Figure 1:
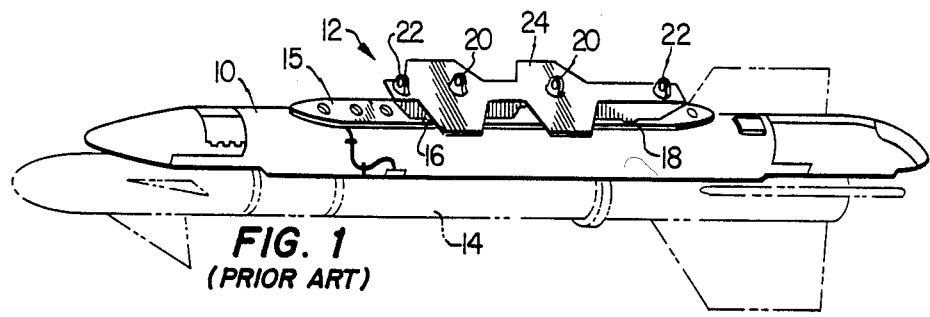
FIG. 1 is an isometric view of a launcher outfitted with a missile, and with a conventional adapter assembly.

FIG. 1 illustrates a well-known launcher 10 and adapter assembly 12 for allowing the launcher 10 to be fixed to fourteen or thirty inch mounting center bomb racks (not shown). A missile 14 is shown in broken lines, in the position normally attached to the launcher 10. The launcher 10 is constructed with an elongate channel or guide rail on the bottom side thereof. The missile 14 includes a mating flange for slidable insertion into the guide rail. In this manner, the missile 14 can be attached to the launcher 10, and launched by being thrust out of the guide rail by its rocket.

Conventional LAU 7/A launchers 10 are constructed with thirty inch mounting centers as generally indicated by reference characters 16 and 18. When the launcher is mounted to aircraft types with thirty inch pylon mountings, the launcher 10 is fixed directly to the aircraft in abutment with the top planar platform surface 15. Threaded fasteners fix the launcher 10 to the aircraft pylons at points 16 and 18. With mating flat mounting surfaces between the pylon and the launcher 10 there is no sway, and thus the adapter 12 is not needed.

The adapter assembly 12 is provided with suspension lugs 20 spaced fourteen inches apart for use with aircraft having fourteen inch bomb racks. Suspension lugs 22 are spaced apart thirty inches to accommodate bomb rack hooks which are spaced thirty inches. When the adapter 12 is used, it is mounted to the missile launcher 10 at the thirty inch fastening locations 16 and 18. Thus, the missile launcher 10 constructed with thirty inch mounting centers can be fixed to fourteen or thirty inch bomb racks by the use of the adapter assembly 12.

The adapter assembly 12 includes four large-area flanges 24 which function as sway braces engageable with bomb rack equipment. Because different bomb racks are equipped with various outrigger abutting equipment at different locations, the sway braces 24 of the adapter assembly 12 are purposely made with extra large areas to universally accommodate the different types of bomb racks. Attached to each side of a conventional bomb rack are two outriggers, with a threaded hole in each such outrigger. A threaded rod with a swivel foot is screwed into the outriggers and adjusted to bear down on the launcher sway brace, thereby providing antisway support to the launcher and missile.

The adapter assembly 12 weighs about thirty pounds and is extremely expensive. In addition, the adapter assembly is about four inches high, thereby fixing the launcher 10 and missile 14 in a lower position under an aircraft wing. The aerodynamics of the aircraft are affected accordingly.

Figure 2:
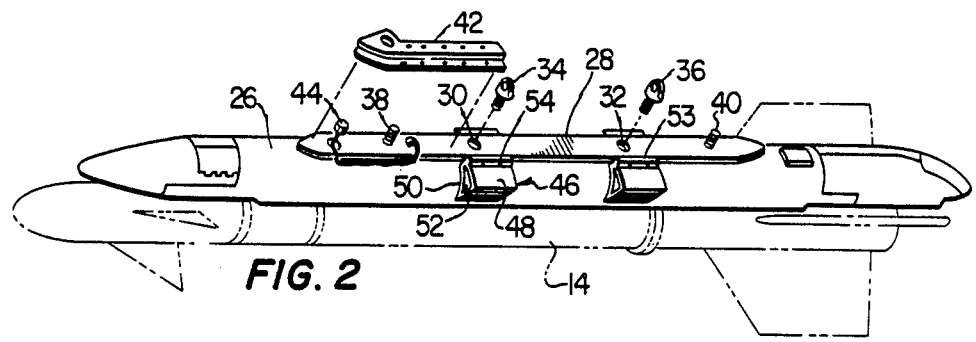
FIG. 2 is an isometric view of a missile launcher and sway brace embodiment constructed in accordance with the invention, and including a missile shown in broken lines.

FIG. 2 illustrates a launcher 26 constructed in accordance with the invention. The general body of the launcher 26, as well as the internal missile launching equipment is substantially the same as that of the well-known launcher 10 of FIG. 1. The launcher 26 is constructed with an elongate planar platform top surface 28 which extends along the top surface of the body of launcher 26. The platform surface 28 is constructed of extruded aluminum material, and formed integral with the tubular body of the extruded aluminum launcher 26. Formed within the platform surface 28 are spaced apart threaded holes 30 and 32 for securement therein by a pair of corresponding bomb rack suspension lugs 34 and 36. The threaded holes 30 and 32 are spaced apart fourteen inches to accommodate one style of aircraft bomb rack. Also formed in the platform surface 28 are a pair of spaced apart pylon mounting lugs 38 and 40, also threaded into the platform surface 28. The pylon mounting lugs 38 and 40 are spaced apart thirty inches to accommodate another style of aircraft pylon mountings. As can be appreciated, various other threaded holes can be formed in the platform surface to accommodate various other styles of aircraft bomb racks or pylon mounting equipment.

The planar platform surface 28 is about 2.38 inches wide and about five feet long. The platform 28 extends above the surface of the launcher body 26 about five-eighths inch to provide side edges. As can be seen, the elongate platform 28 provides additional rigidity to the launcher 26 which is required, especially when the launcher 26 is mounted by the fourteen inch center suspension lugs 34 and 36. The platform surface 28 supplies additional strength to the launcher for the cantilever suspension thereof, as well as the missile 14 which is fixed thereto.

A sheet metal cable cover 42 can be installed over the platform surface 28 to shield an electrical cable 44 which carries signals and power between the aircraft and the missile launcher 26.

In accordance with an important feature of the invention, a number of sway braces, such as 46, are mounted at desired positions on opposing sides of the platform surface 28 to provide in-flight antisway capabilities of the launcher 26 when fixed to an aircraft bomb rack. The sway brace 46 of the invention includes an upper generally flat surface 48 and a lower curved surface 50 for engaging the cylindrical body shape of the launcher 26. The sway brace 46 can also be hollowed 52 to reduce the weight thereof. Each sway brace 46 further includes a flange 55 with holes therein spaced identical to the spacing of corresponding threaded holes formed in each side edge of the platform surface 28. A pair of screws or bolts 53 can then be inserted through the sway brace holes (not shown) and secured at a desired longitudinal position of the launcher platform 28.

When the sway braces 46 are secured to the launcher as described above, bomb rack adjustment screws or other equipment are adjusted to bear down upon the top surface 48 of each brace 46. The curved bottom surface of each brace is flush against the body of the launcher 26, and therefore the braces 46 function as wedges between the aircraft and the tubular launcher 26 to prevent angular movement or other sway tendencies.

Because of the adjustable nature of the sway braces 46 along the longitudinal length of the launcher 26, such braces can be made smaller in size, but yet accommodate bomb racks with different types of outriggers. Smaller sway braces also reduce the weight and cost of the launcher.

Figure 3:
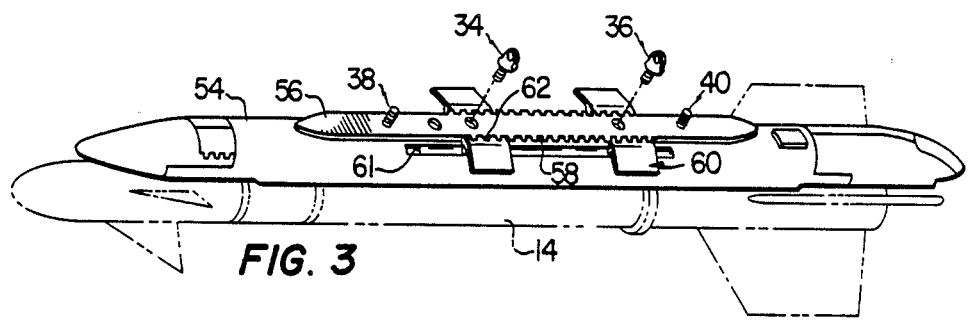
FIG. 3 is an isometric view of a missile launcher and sway brace constructed in accordance with a second embodiment of the invention.

FIG. 3 illustrates another embodiment of the missile launcher and corresponding sway braces constructed in accordance with the invention. The missile launcher 54 of this embodiment includes a rigidizing platform 56 similar to that shown in FIG. 2, but with dovetail mortises 58 formed in the platform side edges. Each sway brace 60 has formed in an edge thereof corresponding dovetail tenons 62 for engagement with the platform mortises 58. The dovetail mortises 58 and tenons 62 are evenly spaced so that the sway brace 60 can be engaged at plural positions along platform 56 of the launcher 54. While not shown in FIG. 3, each sway brace 60 includes a curved foot which fits within a recess 61 in the body of the launcher. The curved foot is fastened by a bolt or screw to the missile launcher body.

Figure 4:
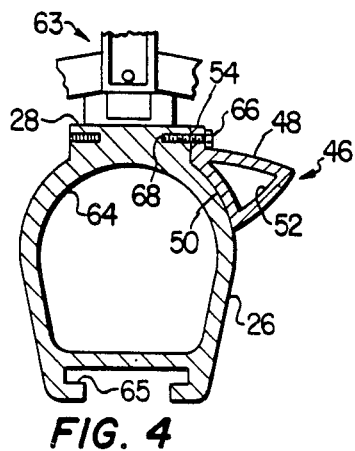
FIG. 4 is a partial sectional view of the launcher of FIG. 2, showing the engagement of the sway brace therewith.

FIG. 4 is a more detailed cross-sectional illustration of the sway brace 46 of FIG. 2, as mounted to the missile launcher 26. Conventional bomb rack equipment is shown generally as numeral 63. The missile launcher 26 is generally cylindrical in shape having an internal elongate cavity 64 for housing the launcher electromechanical equipment identified above. A guide slot 65 extends essentially along the length of the launcher 26 for slideably holding the missile (not shown) The sway brace 46 is formed with an insider curved surface 50 for uniform engagement with the outer curved surface of the missile body 26. The upper abutting surface 48 of the sway brace 46 is shown somewhat curved, but can be formed flat, or with other desired curvatures. A bolt 66, or other suitable fastener, can be inserted into the hole of the sway brace flange 55 and secured into the threaded hole 68 formed in the side edge of the platform surface 28. Each sway brace 46 can be secured using two or more bolts 66. The sway brace 46 can be made with a cavity 52 therethrough to reduce the weight thereof. In practice, a pair of sway braces mounted on each side of the platform surface 28 provides sufficient antisway capability to the launcher 26 and attached missile 14.

Figure 5:
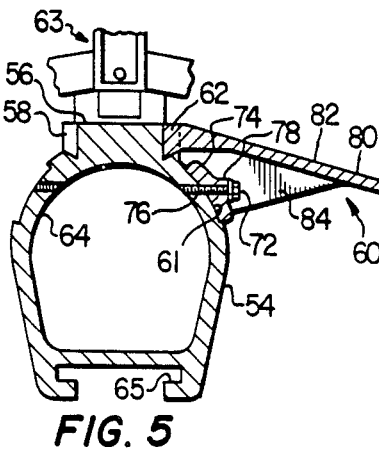
FIG. 5 is a partial sectional view of the launcher of FIG. 3, showing the engagement of the sway brace therewith.

FIG. 5 is a sectional view illustrating another embodiment of the launcher 54 and associated sway brace 60. The launcher platform 56 includes the dovetail mortises 58 formed in the opposing side edges thereof so that the sway brace dovetail tenons 62 can be inserted therein by lowering the sway brace 60 downwardly toward the launcher platform 56. When the dovetail mortises 58 and tenons 62 are fully engaged, the sway brace 60 is fixed to the launcher 54. Because of the loads imposed on the sway brace 60 due to the bomb rack outrigger equipment, a recess or step 61 is formed within the body of the launcher 54 for receiving therein the curved foot 74. The bottom edge of the recess 61 abuts with the bottom edge of the curved foot 74 and thereby provides support for load forces on the sway brace. As an alternative, the recess 61 can be eliminated and a ridge formed on the body of the launcher 54 for abutment with the bottom edge of the sway brace foot 74. The sway brace embodiment of FIG. 2 can be similarly supported.

For added security, a bolt 72 is fastened through the curved foot 74 into a threaded hole 76 formed within the side of the launcher body 54. Plural threaded holes 76 are formed along the side of the launcher body. The provision of the bolt attachment assures that the sway brace will remain attached to the launcher in the event the launcher and attached missile are jettisoned from the aircraft. If the sway braces were to become separated from the launcher in such an event, they could be ingested within an aircraft engine and destroy the aircraft. The curved foot 74 has formed thereon a boss 78 for abutment with the bolt head when secured within the missile body 54. The sway brace 60 has a top plate 80 with an angled planar surface 82 for abutment with aircraft outrigger equipment (not shown). A reinforcing web 84 is formed between the top plate 80 and the curved foot 74.

Figure 6:
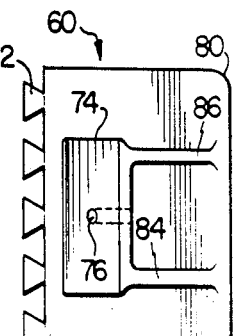
FIG. 6 is a bottom view of a sway brace constructed in accordance with the invention of FIG. 5.

FIG. 6 is a bottom view of the sway brace embodiment of FIG. 5. While the curved foot 74 is shown shortened with respect to the length of the sway brace 60, the foot 74 may be extended in length to provide additional engagement with the curved surface of the missile launcher 54. Also, a pair of support webs 84 and 86 are shown formed integral with the curved foot 74 and the top plate 80. The sway brace 60 can be cast from aluminum. Because of the construction of sway brace 46, it can be extruded from aluminum or other suitable material.

From the foregoing, an improved missile launcher is disclosed, and adapted for mounting to various types of aircraft bomb racks or pylons. An elongate planar platform is formed integral with the body of the launcher to provide strength thereto, as well as side edge mounting surfaces for plural sway braces. Various spaced apart threaded holes are formed in the top of the platform surface to accommodate various spacings of aircraft bomb racks.

In one embodiment of the invention, the side edges of the top platform surface of the launcher include plural spaced apart threaded holes so that sway braces can be adjustably fixed at desired positions therealong to accommodate various types of bomb racks. With this arrangement, the missile launcher can be fixed directly to the aircraft, without intermediate adapter assemblies. As a result, the missile launcher of the invention can be fixed in a position closer to the aircraft, and can be manufactured with less weight and cost.

In another embodiment of the invention the side edges of the platform have formed therein dovetail mortises. Sway braces with corresponding dovetail tenons are engageable with the mortises to locate the sway brace at desired locations along the missile launcher.

While the preferred embodiments of the invention have been disclosed with reference to a specific missile launcher, and a method of fabrication thereof, it is to be understood that many changes in detail may be made as a matter of engineering choices without departing from the spirit and scope of the invention, as defined by the appended claims.

What is claimed is:

1. A missile launcher of the type adapted to be attached to an aircraft, comprising:
   an elongate body forming a housing of said launcher;
   an elongate platform having opposing side edges, and formed integral with said launcher body for strengthening said launcher;
   a pair of elongate recessed areas formed in said launcher body located adjacent said paltform on opposing sides thereof; and
   a plurality of sway braces removably fixed to said opposing side edges of said platform and engageable within said recessed areas to provide sway stability to said launcher when fixed to the aircraft.

2. The missile launcher of claim 1 further including plural fastening means for fastening said launcher to different types of aircrafts.

3. The missile launcher of claim 1 wherein said platform is of the type having a side edge with a plurality of threaded holes for removably fixing said sway braces thereto.

4. The missile launcher of claim 3 wherein said platform includes a plurality of threaded holes spaced along another side edge thereof so as to fix other sway braches at desired positions therealong.

5. The missile launcher of claim 1 wherein said sway braces are generally hollow.

6. The missile launcher of claim 1 wherein said sway braces each include a foot for flush engagement with the body of the launcher.

7. The missile launcher of claim 6 further including means on said launcher body for abutting each said foot to thereby provide load support to said sway braces.

8. A missile launcher of the type adapted to be attached to an aircraft, comprising:
an elongate body forming a housing of said launcher;
an elongate platform having opposing side edges, and formed integral with said launcher body for strengthening said launcher;
a pair of elongate recessed areas formed in said launcher body located adjacent said platform on opposing sides thereof;
a plurality of sway braces removably fixed to said opposing side edges of said platform and engageable within said recessed areas to provide sway stability to said launcher when fixed to the aircraft; and
said platform including in each said side edge thereof a plurality of dovetail mortises for removably fixing said sway braces thereto.

9. The missile launcher of claim 8 wherein each said sway brace includes a plurality of dovetail tenons.

10. The missile launcher of claim 9 wherein said sway braces each include means for abutting engagement body portion of the launcher.

11. The missile launcher of claim 10 wherein said sway braces each include a support foot for providing said abutting engagement with the body of the launcher, and further including means for fixing each said support foot to the launcher body.

* * * * *